(12) United States Patent
Liu et al.

(10) Patent No.: US 7,717,979 B2
(45) Date of Patent: May 18, 2010

(54) COMPOSITION FOR A DESULFURIZER WITH A HIGH SULFUR CAPACITY AND THE PROCESS OF MAKING THE SAME

(75) Inventors: Zhenyi Liu, Beijing (CN); Ke Lin, Beijing (CN); Jie Zhang, Beijing (CN); Fengren Liu, Beijing (CN); Yongsheng Yu, Beijing (CN)

(73) Assignee: Beijing SJ Environmental Protection and New Material Co., Ltd., Beijing (CN)

( * ) Notice: Subject to any disclaimer, the term of this patent is extended or adjusted under 35 U.S.C. 154(b) by 250 days.

(21) Appl. No.: 11/805,727

(22) Filed: May 24, 2007

(65) Prior Publication Data

US 2008/0047395 A1 Feb. 28, 2008

(30) Foreign Application Priority Data

Aug. 28, 2006 (CN) .................... 2006 1 0121945

(51) Int. Cl.
*C22B 1/14* (2006.01)
(52) U.S. Cl. .................................................. 75/770
(58) Field of Classification Search .................. None
See application file for complete search history.

(56) References Cited

U.S. PATENT DOCUMENTS 7,037,876 B2 * 5/2006 O'Brien et al. ............ 502/305

FOREIGN PATENT DOCUMENTS

| CN | 1121950 A | 5/1996 |
|----|-----------|--------|
| CN | 1034422 C | 4/1997 |
| CN | 1312132 A | 9/2001 |
| CN | 1368537 A | 9/2002 |
| CN | 1114462 C | 7/2003 |
| CN | 1136045 A | 1/2004 |
| CN | 1539545 A | 10/2004 |
| JP | 59039345  | 3/1984 |

\* cited by examiner

*Primary Examiner*—Roy King
*Assistant Examiner*—Yoshitoshi Takeuchi
(74) *Attorney, Agent, or Firm*—Schwegman, Lundberg & Woessner, P.A.

(57) ABSTRACT

The present invention discloses a composition for a desulfurizer with a high sulfur capacity and a process for making the same. The composition comprises the active components of three kinds of iron oxides and is used in the desulfurizer to remove hydrogen sulfide from the gaseous and liquid state feed stocks. The process for preparing the composition comprises the following steps: (1) mixing a solid ferrous compound with a solid hydroxide at a molar ratio of iron to hydroxyl being in the range from 1:2 to 1:3; (2) kneading the mixture feeds obtained in step (1) and making them react completely; (3) drying the products obtained in step (2) in the air; (4) washing and filtering the feeds obtained in the step (3); (5) naturally drying or baking the solids obtained in step (4) to form a composition for a desulfurizer with a high sulfur capacity.

8 Claims, 1 Drawing Sheet

COMPOSITION FOR A DESULFURIZER WITH A HIGH SULFUR CAPACITY AND THE PROCESS OF MAKING THE SAME

RELATED APPLICATIONS

This application claims priority under 35 U.S.C. §119 to CN 200610121945.4, filed Aug. 28, 2006, which is incorporated herein by reference and made a part hereof.

TECHNICAL FIELD OF THE INVENTION

This invention relates to a composition for a desulfurizer with a high sulfur capacity and a process of making the same. More specifically, this invention relates to iron oxides as the active components of the composition for a desulfurizer with a high sulfur capacity and the preparation process thereof. Said iron oxides are particularly suitable to serve as the desulfurizer's active components to remove the hydrogen sulfide presents in gaseous and liquid state feed stocks.

BACKGROUND ART

The presence of hydrogen sulfide ($H_2S$) in the course of manufacturing chemical materials from coal or petroleum will poison and thus deactivate catalysts used in the subsequent processing stages. A large amount of industrial waste water or waste gases also contain considerable hydrogen sulfide ($H_2S$) and other sulfides, which will pollute the environment or poison humans or animals if directly emitted. Presently, desulfurizer are usually used in the desulfurization of hydrogen sulfide ($H_2S$)-containing gases such as coal gas, hydrogen, synthetic gas, ammonia gas and gaseous hydrocarbon etc., or hydrogen sulfide-containing liquid hydrocarbons, such as kerosene, gasoline and cyclohexane etc. There are many kinds of desulfurizers, and iron oxide is one conventional desulfurizer. The disadvantages of this kind of desulfurizers are that they can be applied to a narrow range of temperature and air velocity, have a low reactive efficiency and sulfur capacity, and generally can only be employed in the primary crude desulfurization or in combination with other kinds of desulfurizers.

At present, the active components of most iron oxide desulfurizers include other metal oxides besides iron oxides. For example, Chinese Patent Application-CN1287875A discloses a composition $M_xO_y.Fe_2O_3.nH_2O$ comprising ferric oxide monohydrate and one or more other metal compounds, wherein the metal is selected from the group consisting of Ti, Co, Ni, Mo, Zn, Cd, Cr, Hg, Cu, Ag, Sn, Pb and Bi, and/or alkaline-earth metals such as Ca, Mg. Chinese Patent Application-CN1121950A discloses a desulfurizer with crude iron ore, scoria and zinc oxide serving as raw material. Chinese Patent Application-CN1068356A discloses a desulfurizer with iron-mud waste, sintered zinc ferrite as raw material. There are also desulfurizers using crude iron-containing minerals as raw material. For example, Chinese Patent Application-CN1121950A discloses a desulfurizer comprising crude iron ore, scoria and zinc oxide, and Chinese Patent Application-CN1368537A discloses a desulfurizer comprising ore rich in iron, lignite and a small quantity of calcareousness, wherein the ore rich in iron can be hematite. Japanese Patent Application No. JP59039345 discloses a desulfurizer comprising 40 to 90% iron oxide (such as hematite), titanium dioxide and silicon dioxide. Although the costs of said desulfurizer are low, it is difficult to keep the active components of the desulfurizer stable because the components of the raw material are variable.

Additionally, ferrite is used as the raw material to prepare desulfurizers with a wet method. For example, Chinese Patent Application-CN1312132A discloses a desulfurizer prepared by reacting ferrous sulphate solution, ammonia as precipitator, calcareousness, sodium carbonate, and a small quantity of metal oxides. Several side-reactions will take place during the precipitation when the ferric salt solution precipitation method is used to form the iron oxides, and it is difficult to control these side-reactions by adjusting the pH value. Thus, it is difficult to control the final composition of the active components, which makes the sulfur capacity uncontrollable.

Additionally, there are also a kind of desulfurizers containing iron or iron oxide as sole active component. For example, Chinese Patent Application-CN1539545 discloses a desulfurizer comprising 15 to 80% iron oxide and Direct Reduced Iron (spongy iron); U.S. Pat. No. 5,102,636 discloses a desulfurizer comprising 5 to 95% iron oxide and 95 to 5% iron complex. This kind of desulfurizers sufficiently take advantage of the desulfurizing function of the iron, however, the cost is relatively high.

Chinese Patent Application-CN 1395994A discloses a process for preparing an iron additive used in iron-alkali desulfurizing catalyst, wherein a ferrous sulfate (or ferrous chloride) solution and a sodium carbonate (or sodium hydroxide) solution are mixed to cause precipitation reaction to form said iron additive. This reaction in the solution is apt to obtaining colloid which is uneasy to be washed.

It is well known that the performance of a desulfurizer primarily depends on factors, such as sulfur capacity, desulfurizing precision and temperature. The higher the sulfur capacity and the desulfurizing precision, the better the performance of the desulfurizer becomes. However, the sulfur capacity of the present iron oxide desulfurizers is less than 40%.

DETAILED DESCRIPTION OF THE INVENTION

The first object of the present invention is to provide a composition for a desulfurizer capable of removing $H_2S$ present in gaseous or liquid state feed stocks without the control of the temperature and pressure.

The second object of the present invention is to provide a process for preparing said composition for a desulfurizer with a high sulfur capacity. The process is simple and easy to operate, consumes less energy and produces products with a stable quality.

The technical solution for achieving the first object of this invention relates to the composition for the desulfurizer, characterized in that said composition comprises three species of iron oxides which are ferroferric oxide in the form of cubic crystalline phase ($Fe_3O_4$), amorphous ferric oxide ($Fe_2O_3$) and amorphous ferric oxide monohydrate ($Fe_2O_3.H_2O$), wherein the contents of the iron oxides in said are: 3.0 wt % to 3.5 wt % of $Fe_3O_4$, 28 wt % to 30 wt % of $Fe_2O_3$, 60 wt % to 62 wt % of $Fe_2O_3.H_2O$, the balancing being water and residual by-products of this reaction, the above percentages are based on the total weight of said compositions. Said residual reactants of this reaction are the by-products remained during preparing said three kinds of iron oxides.

Said composition for the desulfurizer has a surfur capacity of at least 40%.

The technical solution for achieving the second object of this invention relates to a process for preparing the composition for a desulfurizer with a high sulfur capacity, characterized in that it comprises the following steps: (1) mixing a solid ferrous compound with a solid hydroxide at a molar ratio of iron to hydroxyl in the range from 1:2 to 1:3; (2) kneading the mixture feeds obtained in step (1) and making them react completely; (3) drying the products obtained in step (2) in the air; (4) washing and filtering the feeds obtained in step (3); and (5) naturally drying or baking the solids obtained in step (4) to form a composition for a desulfurizer with a high sulfur capacity.

In the above preparation process, the solid ferrous compound in step (1) is selected from ferrous sulfate, ferrous nitrate or ferrous chloride, preferably the ferrous sulfate, and the solid hydroxide is selected from sodium hydroxide, potassium hydroxide or calcium hydroxide, preferably sodium hydroxide. In step (2), the mixture is placed in a kneader, and the reaction is sufficiently completed under the pressure of the kneader. The kneading time for the completion of the reaction is at least 15 minutes, preferably 15 minutes to 30 minutes. When using natural drying in step (5), said compositon is placed in the air at ambient temperature of 5° C. to 45° C., while using baking process in step (5), baking temperature is at most 90° C., preferably 70° C. to 90° C.

The advantageous effects of the present invention are as follows: (1) the composition for the desulfurizer comprises not only ferroferric oxide in the form of cubic crystalline phase, but also two kinds of amorphous ferric oxides including amorphous ferric oxide and amorphous ferric oxide monohydrate. Thus, the desulfurizing performance of said iron oxides with various structure can be fully utilized. The determined content of iron in the desulfurizer guarantees a stable quality of the desulfurizer products containing the ferric oxides. (2) According to the process of the present invention, the various ferric oxide products can be acquired through one-off appending the solid ferrous compound and solid hydroxid as the feed stocks, and the process is so simple as to operate. (3) According to the process for making a composition for a desulfurizer with a high sulfur capacity of the present invention, solid ferrous compound and solid hydroxide are reacted at a given ratio in the solid phase. Compared with liquid phase precipitation process generally used at present, it is easier to operate and easier to control the reaction products, without colloidal ferrous hydroxide $Fe(OH)_2$ and ferric hydroxide $Fe(OH)_3$ formed during the reaction process, so avoiding the trouble of filtrating these colloids. (4) In the present invention, the reaction for preparing three kinds of iron oxides is an exothermic one, the heat released is sufficiently used in the mixing and the kneading process, so it consumes less energy. (5) Dehydration of iron oxide hydrate formed in the solid phase reaction and crystalline phase convertion of different iron oxides are completed by drying in the air, which is simple and less energy consuming as that the composition for the desulfurizer is kept stable, and further the stability of desulfurizing performance is guaranteed.

DESCRIPTION OF PREFERRED EMBODIMENTS

Figure 1:
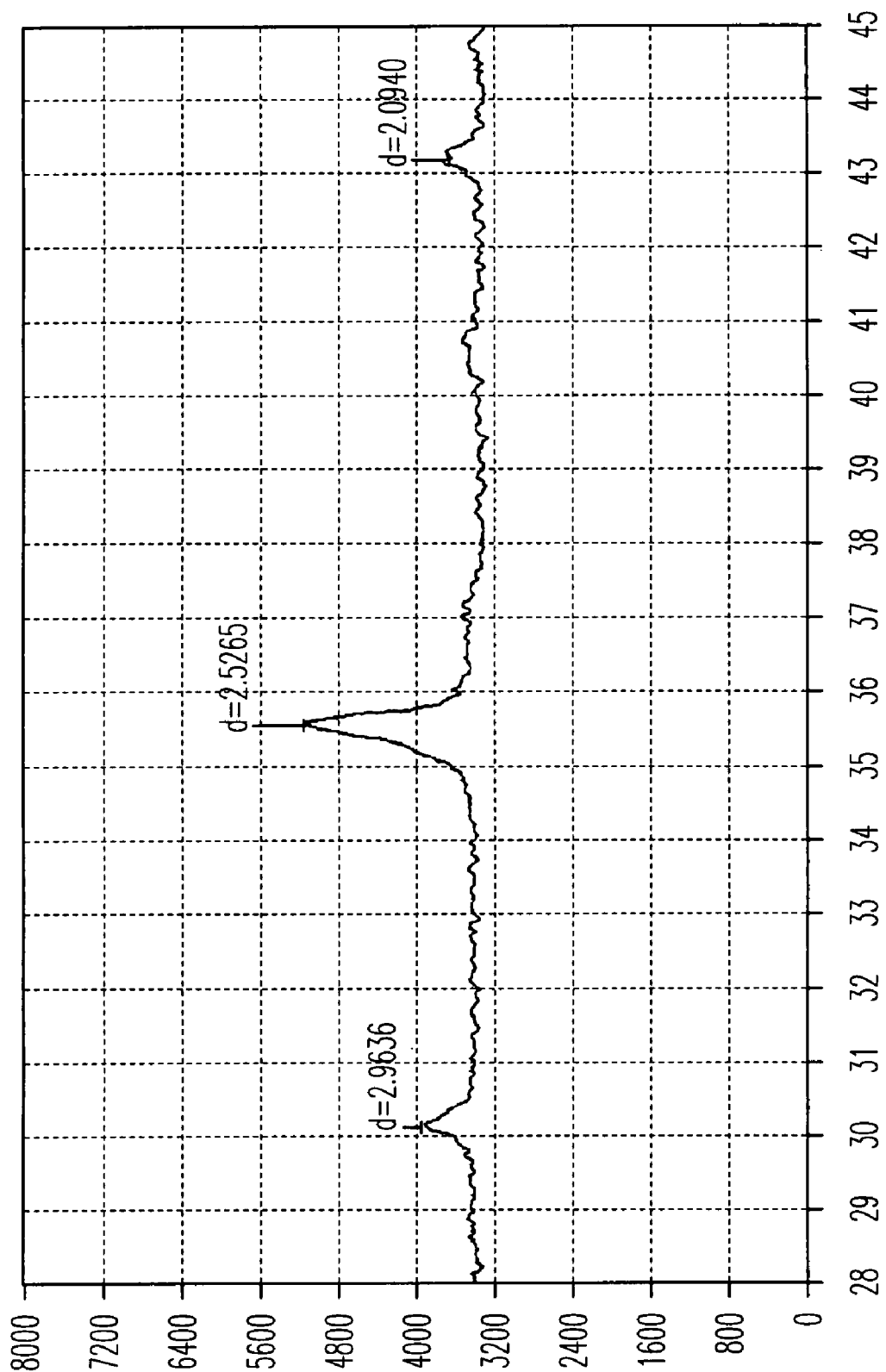
FIG. 1 is the X-ray diffraction Pattern of a composition for a desulfurizer with a high sulfur capacity.

The invention will be described in detail in conjuction with but not limited to the following drawing and specific examples.

FIG. 1 represents the X-ray diffraction Pattern of the composition for the desulfurizer with a high sulfur capacity, compared with the standard X-ray diffraction fiche (J.C.P.D.S fiche), wherein d values are equal to 2.9636, 2.5265 and 2.0940, said data represent the cubic crystalline phase of ferroferric oxide ($Fe_3O_4$).

The main raw materials are solid ferrous sulfate and sodium hydroxide in examples, said materials are eligible industrial products, wherein ferrous sulfate contains 88 wt % to 93 wt % fraction of ferrous sulfate with heptahydrate ($FeSO_4 \cdot 7H_2O$), and sodium hydroxide contains 90 wt % to 93 wt % fraction of NaOH. Tap water is used for washing. Baking is operated in a electric-hot blast drying box. The type of the kneader is CD4×1TS multifunctional catalyst molding machine.

EXAMPLE 1

The Composition for the Desulfurizer with a High Sulfur Capacity and the Process for Preparing the Same The preparation process in this example includes the following steps:

(1) homogeneously mixing 32 kg ferrous sulfate powder with 12 kg sodium hydroxide at a molar ratio of iron to hydroxyl being 1:2.8, (2) placing the mixture feeds obtained in step (1) in a kneader and kneading them for 3 hours to complete the solid phase reaction, (3) drying the reaction products obtained in step (2) in the air, (4) adding water to the mixture obtained in step (3) and stirring, repeatedly washing said mixture until sulfate ion is absent in the filtrate (which is usually examined with the barium chloride), then centrifugally filtrating the mixture solution with a centrifuge, (5) drying the solid obtained in step (4) at a temperature of 80° C. for 3 hours, then obtaining the composition for the desulfurizer with a high sulfur capacity, labeling said composition as Composition A.

The Composition A comprises 3.3 wt % ferroferric oxide in the form of cubic crystalline phase ($Fe_3O_4$), 29.0 wt % amorphous ferric oxide ($Fe_2O_3$) and 60.7 wt % amorphous ferric oxide monohydrate ($Fe_2O_3 \cdot H_2O$), and the balancing being sodium sulfate and water. The percentages are based on the total weight of said composition.

EXAMPLE 2

The Composition for the Desulfurizer with a High Sulfur Capacity and the Process for Preparing the Same The preparation process in this example includes the following steps:

(1) homogeneously mixing 64 kg ferrous sulfate powder with 21.2 kg sodium hydroxide at a molar ratio of iron to hydroxyl being 1:2.4, (2) placing the mixture feeds obtained in step (1) in a kneader and kneading them for 0.5 hour to complete the solid phase reaction, (3) drying the reaction products obtained in step (2) in the air, (4) adding water to the mixture obtained in step (3) and stirring, repeatedly washing said mixture until sulfate ion is absent in the filtrate (which is usually examined with the barium chloride), then centrifugally filtrating the mixture solution with a centrifuge, (5) naturally drying the solid obtained in step (4) in the air to obtain the composition for the desulfurizer with a high sulfur capacity, labeling said composition as Composition B.

The Composition B comprises 3.3 wt % ferroferric oxide in the form of cubic crystalline phase ($Fe_3O_4$), 28.9 wt % amorphous ferric oxide ($Fe_2O_3$) and 61.9 wt % amorphous ferric oxide monohydrate ($Fe_2O_3.H_2O$), and the balancing being sodium sulfate and water. The percentages are based on the total weight of said composition.

EXAMPLE 3

The Composition for the Desulfurizer with a High Sulfur Capacity and the Process for Preparing the Same In the present example, the steps are same as example 2, except that the kneading time in step (2) is 1 hour. Said composition for the desulfurizer with a high sulfur capacity is labeled Composition C.

The Composition C comprises 3.2 wt % ferroferric oxide in the form of cubic crystalline phase ($Fe_3O_4$), 28.7 wt % amorphous ferric oxide ($Fe_2O_3$) and 61.8 wt % amorphous ferric oxide monohydrate ($Fe_2O_3.H_2O$), and the balancing being sodium sulfate and water. The percentages are based on the total weight of said composition.

EXAMPLE 4

The Composition for the Desulfurizer with a High Sulfur Capacity and the Process for Preparing the Same The preparation process in this example includes the following steps:

(1) homogeneously mixing 64 kg ferrous sulfate powder with 22 kg sodium hydroxide at a molar ratio of iron to hydroxyl being 1:2.5, (2) placing the mixture feeds obtained in the step (1) in a kneader and kneading them for 15 minutes to complete the solid phase reaction, (3) drying the reaction products obtained in step (2) in the air, (4) adding water to the mixture obtained in step (3) and stirring, repeatedly washing said mixture until sulfate ion is absent in the filtrate (which is usually examined with barium chloride), then centrifugally filtrating the mixture solution with a centrifuge, (5) drying the solid obtained in step (4) at a temperature of 90° C. for 3 hours to obtain the composition for the desulfurizer with a high sulfur capacity, and labeling said composition as Composition D.

The Composition D comprises 3.3 wt % ferroferric oxide in the form of cubic crystalline phase ($Fe_3O_4$), 29.0 wt % amorphous ferric oxide ($Fe_2O_3$) and 62.0 wt % amorphous ferric oxide monohydrate ($Fe_2O_3.H_2O$), and the balancing being sodium sulfate and water. The percentages are based on the total weight of said composition.

EXAMPLE 5

The Composition for the Desulfurizer with a High Sulfur Capacity and the Process for Preparing the Same In the present example, the steps are same as example 2, except that the kneading time in step (2) is 2 hours, and the drying in step (5) is baking at a temperature of 90° C. for 1 hour. Said composition is labelled as Composition E.

The Composition E comprises 3.1 wt % ferroferric oxide in the form of cubic crystalline phase ($Fe_3O_4$), 28.6 wt % amorphous ferric oxide ($Fe_2O_3$) and 61.2 wt % amorphous ferric oxide monohydrate ($Fe_2O_3.H_2O$), and the balancing being sodium sulfate and water. The percentages are based on the total weight of said composition.

EXAMPLE 6

The Composition for the Desulfurizer with a High Sulfur Capacity and the Process for Preparing the Same In the present example, the steps are same as example 5, except that the drying in step (5) is naturally drying in the air. Said composition is labeled as Composition F.

The Composition F comprises 3.0 wt % ferroferric oxide in the form of cubic crystalline phase ($Fe_3O_4$), 28.7 wt % amorphous ferric oxide ($Fe_2O_3$) and 61.3 wt % amorphous ferric oxide monohydrate ($Fe_2O_3.H_2O$), and the balancing being sodium sulfate and water. The percentages are based on the total weight of said composition.

EXAMPLE 7

The Composition for the Desulfurizer with a High Sulfur Capacity and the Process for Preparing the Same The preparation process in this example includes the following steps:

(1) homogeneously mixing 64 kg ferrous sulfate powder with 20 kg sodium hydroxide at a molar ratio of iron to hydroxyl being 1:2.3, (2) placing the mixture feeds obtained in step (1) in a kneader and kneading them for 1 hour to complete the solid phase reaction, (3) drying the reaction products obtained in step (2) in the air, (4) adding water to the mixture obtained in step (3) and stirring, repeatedly washing said mixture until sulfate ion is absent in the filtrate (which is usually examined with the barium chloride), then centrifugally filtrating the mixture solution with a centrifuge, (5) drying the solid obtained in step (4) at 70° C. for 3 hours to obtain the composition for the desulfurizer with a high sulfur capacity, labeling said composition as Composition G.

The Composition G comprises 3.2 wt % ferroferric oxide in the form of cubic crystalline phase ($Fe_3O_4$), 28.6 wt % amorphous ferric oxide ($Fe_2O_3$) and 61.6 wt % amorphous ferric oxide monohydrate ($Fe_2O_3.H_2O$), and the balancing being sodium sulfate and water. The percentages are based on the total weight of said composition.

EXAMPLE 8

The Composition for the Desulfurizer with a High Sulfur Capacity and the Process for Preparing the Same The preparation process in this example includes the following steps:

(1) homogeneously mixing 92 kg ferrous sulfate powder with 28 kg sodium hydroxide at a molar ratio of iron to hydroxyl being 1:2.2, (2) placing the mixture feeds obtained in step (1) in a kneader and kneading them for 1 hour to complete the solid phase reaction, (3) drying the reaction products obtained in step (2) in the air, (4) adding water to the mixture obtained in step (3) and stirring, repeatedly washing said mixture until sulfate ion is absent in the filtrate (which is usually examined with barium chloride), then centrifugally filtrating the mixture solution with a centrifuge, (5) naturally drying the solid obtained in step (4) in the air to obtain the composition for the desulfurizer with a high sulfur capacity, labeling said composition as Composition H.

The Composition H comprises 3.2 wt % ferroferric oxide in the form of cubic crystalline phase ($Fe_3O_4$), 28.6 wt % amorphous ferric oxide ($Fe_2O_3$) and 61.5 wt % amorphous ferric oxide monohydrate ($Fe_2O_3.H_2O$), and the balancing being sodium sulfate and water. The percentages are based on the total weight of said composition.

EXAMPLE 9

The Composition for the Desulfurizer with a High Sulfur Capacity and the Process for Preparing the Same The preparation process in this example includes the following steps:

(1) homogeneously mixing 64 kg ferrous sulfate powder with 18.4 kg sodium hydroxide at a molar ratio of iron to hydroxyl being 1:2.1, (2) placing the mixture feeds obtained in step (1) in a kneader and kneading them for 0.5 hour to complete the solid phase reaction, (3) drying the reaction products obtained in step (2) in the air, (4) adding water to the mixture obtained in step (3) and stirring, repeatedly washing said mixture until sulfate ion is absent in the filtrate (which is usually examined with barium chloride), then centrifugally filtrating the mixture solution with a centrifuge, (5) drying the solid obtained in step (4) at 80° C. for 2 hours to obtain the composition for the desulfurizer with a high sulfur capacity, labeling said composition as Composition I.

The Composition I comprises 3.3 wt % ferroferric oxide in the form of cubic crystalline phase ($Fe_3O_4$), 28.9 wt % amorphous ferric oxide ($Fe_2O_3$) and 61.8 wt % amorphous ferric oxide monohydrate ($Fe_2O_3.H_2O$), and the balancing being sodium sulfate and water. The percentages are based on the total weight of said composition.

The method for analyzing various iron oxide contents in the composition for the desulfurizer with high sulfur capacity A to I is as follows: According to <<The chemistry analysis process for the iron ore and the capacity process for measuring the amount of the whole iron with titanium trichloride and potassium dichromate>> (GB 6730.5-86), the whole-iron content and ferrous ion content of the composition for the desulfurizer can be measured, so as to figure out the total content of ferric ion. Based on Thermogravimetry—Differential Thermal Analysis pattern, the content of crystalline water in ferric oxide monohydrate($Fe_2O_3.H_2O$) can be obtained. From said content of ferrous ion, the content of the crystalline phase of ferroferric oxide can be calculated, and the content of ferric ion of crystalline phase ferroferric oxide can be obtained accordingly. From the content of crystalline water in ferric oxide monohydrate ($Fe_2O_3.H_2O$), the content of ferric oxide monohydrate ($Fe_2O_3.H_2O$) can be figured out, and then content of ferric ion of ferric oxide monohydrate ($Fe_2O_3.H_2O$) can be obtained. The content of the ferric ion in ferric oxide ($Fe_2O_3$) can be figured out by subtracting the content of ferric ion in ferroferric oxide and in ferric oxide monohydrate ($Fe_2O_3.H_2O$) from the total content of ferric ion.

Evaluation of the performance of the composition for the desulfurizer with a high sulfur capacity in the present invention.

Detailed Examination Method

At normal temperature (ambient temperature, usually 5□ to 45□, the same in the following paragraphs) and pressure (atmosphere pressure, usually one atmosphere pressure, the same in the following paragraphs), 5 g Composition A to I prepared in example 1 to example 9 were evaluated by using a standard gas containing 40000 ppm hydrogen sulfide ($H_2S$). For qualitative detection, the sulfur from the outlet is measured by using 1% self-prepared silver nitrate solution, and for quantitative detection, the WK-2C integrated microcoulombmeter (manufactured by jiangsu electroanalysis instrument factory) was used. The lowest detectable content of said instrument is 0.2 ppm. The test results are shown in table 1.

TABLE 1

| | Example | | | | | | | | |
|---|---|---|---|---|---|---|---|---|---|
| | 1 | 2 | 3 | 4 | 5 | 6 | 7 | 8 | 9 |
| Composition | A | B | C | D | E | F | G | H | I |
| Sulfur capacity (%) | 48.0 | 50.8 | 47.2 | 51.3 | 51.0 | 40.0 | 50.2 | 46.9 | 47.9 |

It can be seen from table 1 that the composition for the desulfurizer with a high sulfur capacity of the present invention when used under at normal temperature and pressure, has a sulfur capacity of at least 40%, and up to 51.3%.

Results of application experimental test using desulfurizers prepared from the composition of the present invention are as follows.

APPLICATION EXAMPLE 1

135 g Composition I in example 9 was mixed with 10 g sheep-sweet-earth and 5 g graphite together, followed by adding a proper amount of water. The mixture was kneaded and extruded to form the desulfurizer in the shape of a bar with a diameter of 4 mm. Said desulfurizer has a sulfur capacity for breakthrough of 41.0% and a intensity of side pressure of 49N/cm.

APPLICATION EXAMPLE 2

135 g Composition B of example 2 was mixed with 10 g sheep-sweet-earth and 5 g graphite together, followed by adding a proper amount of water. The mixture was kneaded and extruded to form the desulfurizer in the shape of a bar with a diameter of 4 mm. Said desulfurizer has a sulfur capacity for breakthrough of 43.0% and a intensity of side pressure of 52N/cm.

What is claimed is:

1. A process for preparing a composition for a desulfurizer, wherein the composition comprises three kinds of iron oxides which are ferroferric oxide in the form of cubic crystalline phase ($Fe_3O_4$), amorphous ferric oxide ($Fe_2O_3$) and amorphous ferric oxide monohydrate ($Fe_2O_3 \cdot H_2O$), wherein the contents of the iron oxides in said composition are: 3.0 wt % to 3.5 wt % of $Fe_3O_4$, 28 wt % to 30 wt % of $Fe_2O_3$, 60 wt % to 62 wt % of $Fe_2O_3 \cdot H_2O$, the balance being water and residual by-products of this reaction, the above percentages are based on the total weight of said compositions, the process comprising the following steps:

(1) mixing a solid ferrous compound with a solid hydroxide at a molar ratio of iron to hydroxyl in the range from 1:2 to 1:3;
(2) kneading the mixture feeds obtained in step (1) and making them react completely;
(3) drying the products obtained in step (2) in the air;
(4) washing and filtering the feeds obtained instep (3); and
(5) drying at ambient temperature or baking the solids obtained in step (4) to form the composition for a desulfurizer.

2. The process for preparing the composition according to claim 1, characterized in that said solid ferrous compound in step (1) is selected from ferrous sulfate ($FeSO_4$), ferrous nitrate ($Fe(NO_3)_2$) or ferrous chloride ($FeCl_2$), and said solid hydroxide is selected from sodium hydroxide (NaOH), potassium hydroxide (KOH) or calcium hydroxide ($Ca(OH)_2$).

3. The process for preparing the composition according to claim 2, characterized in that said solid ferrous compound is ferrous sulfate ($FeSO_4$), and said solid hydroxide is sodium hydroxide (NaOH).

4. The process for preparing the composition according to claim 1, characterized in that said kneading in step (2) is accomplished with a kneader, and the kneading time for the completion of the reaction is at least 15 minutes.

5. The process for preparing the active components based on claim 4, characterized in that said kneading is accomplished with a kneader, and the kneading time for the completion of the reaction is in the range from 15 minutes to 30 minutes.

6. The process for preparing the composition according to claim 1, characterized in that the drying in step (5) is drying at a temperature of between 5° C. and 45° C.

7. The process for preparing the composition according to claim 1, characterized in that the drying in step (5) is baking, and the baking temperature is at most 90° C.

8. The process for preparing the composition according to claim 7, characterized in that the baking temperature in step (5) is between 70° C. and 90° C.

* * * * *